US012386288B2

(12) United States Patent
Izumichi et al.

(10) Patent No.: US 12,386,288 B2
(45) Date of Patent: Aug. 12, 2025

(54) IMAGE FORMING APPARATUS CAPABLE OF STABILIZING ELECTRICAL CONNECTION BETWEEN MOVABLE UNIT AND SUPPORT UNIT INCLUDED IN FIXING DEVICE

(71) Applicant: KYOCERA Document Solutions Inc., Osaka (JP)

(72) Inventors: Sachio Izumichi, Osaka (JP); Takehiro Sato, Osaka (JP); Keiju Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/638,387

(22) Filed: Apr. 17, 2024

(65) Prior Publication Data

US 2024/0353779 A1 Oct. 24, 2024

(30) Foreign Application Priority Data

Apr. 19, 2023 (JP) ................................ 2023-068390

(51) Int. Cl.
*G03G 15/20* (2006.01)

(52) U.S. Cl.
CPC ..... *G03G 15/2017* (2013.01); *G03G 15/2064* (2013.01)

(58) Field of Classification Search
None
See application file for complete search history.

(56) References Cited

U.S. PATENT DOCUMENTS

| | | | | | |
|---|---|---|---|---|---|
| 5,323,216 | A * | 6/1994 | Mahoney | G03G 15/2064 399/68 |
| 5,579,098 | A * | 11/1996 | Noguchi | G03G 15/2064 399/122 |
| 2004/0190939 | A1* | 9/2004 | Yamanaka | G03G 15/2032 399/122 |
| 2005/0271432 | A1* | 12/2005 | Chiba | G03G 15/2064 399/328 |
| 2011/0013936 | A1* | 1/2011 | Fujii | G03G 15/2032 399/328 |

(Continued)

FOREIGN PATENT DOCUMENTS

| | | | | |
|---|---|---|---|---|
| JP | 2006072246 | A * | 3/2006 | |
| JP | 2012194331 | A | 10/2012 | |
| JP | 2021015159 | A * | 2/2021 | G03G 15/2039 |

*Primary Examiner* — Sevan A Aydin
(74) *Attorney, Agent, or Firm* — Alleman Hall & Tuttle LLP

(57) ABSTRACT

An image forming apparatus includes a movable unit, a support unit, a protruding portion, a guide portion, and a pressing portion. The movable unit includes a fixing member and a pressure member, and swings along a width direction of a sheet. The support unit supports the movable unit. The protruding portion is electrically conductive and is provided to protrude from a first unit of one of the movable unit and the support unit toward a second unit of the other. The guide portion is electrically conductive and is formed in the second unit so that the protruding portion can be inserted therein, and guides the protruding portion along the width direction. The pressing portion presses the movable unit in a pressing direction perpendicular to the width direction and along a horizontal plane.

5 Claims, 11 Drawing Sheets

(56) References Cited

U.S. PATENT DOCUMENTS

| | | | | |
|---|---|---|---|---|
| 2011/0020033 | A1* | 1/2011 | Nagase | G03G 15/2064 399/122 |
| 2012/0237259 | A1 | 9/2012 | Tanda | |
| 2014/0064755 | A1* | 3/2014 | Mogi | G03G 21/1685 399/329 |
| 2014/0064787 | A1* | 3/2014 | Mogi | G03G 15/2053 399/329 |
| 2014/0064788 | A1* | 3/2014 | Mogi | G03G 15/2053 399/329 |
| 2015/0370201 | A1* | 12/2015 | Watatani | G03G 15/2017 399/328 |
| 2023/0127764 | A1* | 4/2023 | Yamauchi | G03G 15/80 399/330 |
| 2023/0375965 | A1* | 11/2023 | Fujiwara | G03G 15/2064 |

* cited by examiner

IMAGE FORMING APPARATUS CAPABLE OF STABILIZING ELECTRICAL CONNECTION BETWEEN MOVABLE UNIT AND SUPPORT UNIT INCLUDED IN FIXING DEVICE

INCORPORATION BY REFERENCE

This application is based upon and claims the benefit of priority from the corresponding Japanese Patent Application No. 2023-068390 filed on Apr. 19, 2023, the entire contents of which are incorporated herein by reference.

BACKGROUND

The present disclosure relates to an electrophotographic image forming apparatus.

An electrophotographic image forming apparatus transfers a toner image from an image-carrying member to a sheet, and fixes the toner image to the sheet using a fixing device. The fixing device includes a fixing member that forms a fixing nip portion for fixing the toner image to the sheet, and a pressure roller.

SUMMARY

The image forming apparatus according to the present disclosure includes a movable unit, a support unit, a protruding portion, a guide portion, and a pressing portion. The movable unit includes a fixing member and a pressure member that form a fixing nip portion for fixing a toner image to the sheet, and is swinged along a width direction of the sheet. The support unit supports the movable unit below the movable unit. The protruding portion is electrically conductive and is provided to protrude from a first unit of one of the movable unit and the support unit toward a second unit of the other. The guide portion is electrically conductive and is formed in the second unit so that the protruding portion can be inserted therein, and guides the protruding portion along the width direction with the protruding portion swinging relative to the second unit. The pressing portion presses the movable unit in a pressing direction perpendicular to the width direction and along a horizontal plane.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the drawings. Note that the following embodiments are examples of embodying a technique according to the present disclosure, and do not limit the technical scope of the present disclosure.

[Configuration of Image Forming Apparatus 10]

An image forming apparatus 10 according to an embodiment executes a print process using an electrophotographic method. The printing process is a process of forming an image on a sheet 9.

Figure 1:
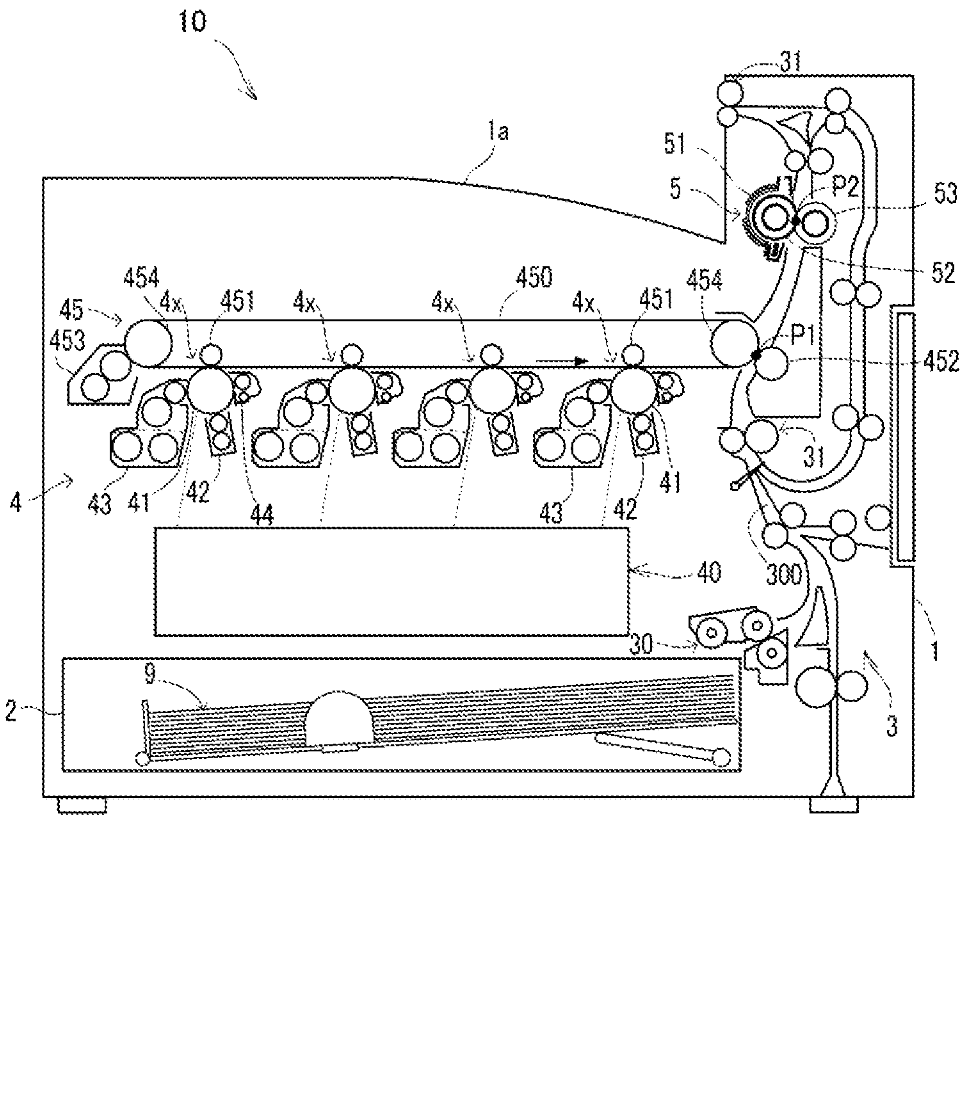
FIG. 1 is a configuration diagram of an image forming apparatus according to an embodiment.

As shown in FIG. 1, the image forming apparatus 10 includes a sheet storing portion 2, a sheet conveying device 3, and a printing device 4. The sheet conveying device 3 and the printing device 4 are housed in a main portion 1 (see FIG. 1), which is a housing.

The sheet storing portion 2 is able to store a plurality of sheets 9. The sheet conveying device 3 includes a sheet feeding device 30 and a plurality of conveying roller pairs 31.

The sheet feeding device 30 feeds out the sheets 9 in the sheet storing portion 2 one by one to a conveying path 300. The conveying path 300 is a path for the sheet 9.

The plurality of conveying roller pairs 31 convey the sheet 9 along the conveying path 300. One set of the plurality of conveying roller pairs 31 discharges the sheet 9 on which an image is formed from the conveying path 300 onto a discharge tray 1*a* (see FIG. 1).

The printing device 4 executes the printing process on the sheet 9 conveyed along the conveying path 300. The image formed on the sheet 9 is a toner image.

The printing device 4 includes an optical scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The optical scanning unit 40 scans the surface of the charged photoconductor 41 with a beam of light. Thus, the optical scanning unit 40 forms an electrostatic latent image on the surface of the photoconductor 41.

The developing device 43 supplies toner to the surface of the photoconductor 41 to develop the electrostatic latent image into a toner image. The transfer device 45 transfers the toner image formed on the surface of the photoconductor 41 to the sheet 9.

The transfer device 45 transfers the toner image to the sheet 9 at a transfer position P1 on the conveying path 300.

In the present embodiment, the printing device 4 is a tandem color printing device including a plurality of image forming portions 4*x*. In addition, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* corresponding to four colors of toner: yellow, magenta, cyan, and black. The transfer device 45 includes four primary transfer devices 451 corresponding to the four image forming portions 4*x*.

The intermediate transfer belt 450 is rotatably supported by a plurality of support rollers 454. One of the plurality of support rollers 454 is rotated by being driven by a belt drive device (not shown). Thus, the intermediate transfer belt 450 rotates.

Each of the primary transfer devices 451 transfers the toner image formed on the surface of the photoconductor 41 in each of the image forming portions 4*x* to the surface of the intermediate transfer belt 450. Thus, a composite toner image in which the four color toner images are combined is formed on the surface of the intermediate transfer belt 450.

The intermediate transfer belt 450 rotates while carrying the composite toner image. The secondary transfer device 452, at the transfer position P1, transfers the composite toner image formed on the surface of the intermediate transfer belt 450 to the sheet 9.

The drum cleaning device 44 removes primary waste toner from the surface of the photoconductor 41. The primary waste toner is toner that remains at a portion on the surface of the photoconductor 41 that has passed through the primary transfer device 451.

The belt cleaning device 453 removes secondary waste toner from the surface of the intermediate transfer belt 450. The secondary waste toner is toner that remains at a portion on the surface of the intermediate transfer belt 450 that has passed through the secondary transfer device 452.

The fixing device 5 heats and presses the composite toner image on the sheet 9 at a fixing position P2 on the conveying path 300. Thus, the fixing device 5 fixes the composite toner image to the sheet 9. The fixing position P2 is a position on the downstream side in the sheet conveying direction with respect to the transfer position P1.

Figure 2:
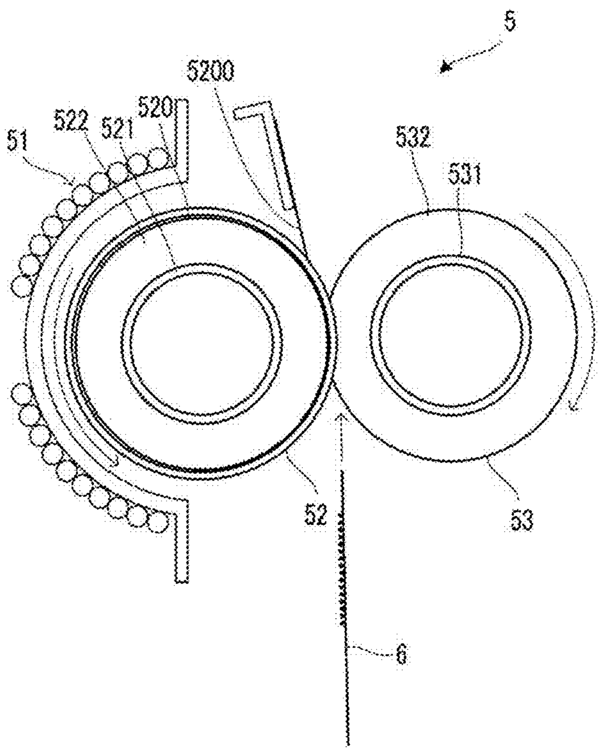
FIG. 2 is a diagram showing a configuration of main parts of a fixing device in the image forming apparatus according to the embodiment.

As shown in FIG. 2, the fixing device 5 includes a heater 51, a fixing belt 52, a fixing roller 520, a pressure roller 53, and a sheet separating member 5200.

The fixing belt 52 is a flexible cylindrical member that includes the fixing roller 520 therein. The fixing belt 52 is heated by the heater 51.

The fixing roller 520 is a cylindrical member that supports the fixing belt 52 on the inner side of the fixing belt 52. The fixing roller 520 includes a cylindrical metal core portion 521 and an elastic portion 522 formed around the outer periphery of the metal core portion 521.

The fixing roller 520 is rotatably supported. The fixing belt 52 is rotatable together with the fixing roller 520.

The fixing belt 52 includes a conductive base material, an elastic layer formed around the outer periphery of the base material, and a release layer formed around the outer periphery of the elastic layer.

The heater 51 is arranged to face the outer peripheral surface of the fixing belt 52. In this embodiment, the heater 51 is an electromagnetic induction type heating device. The heater 51 mainly heats the base material of the fixing belt 52 by electromagnetic induction.

The pressure roller 53 is rotatably supported. Similar to the fixing roller 520, the pressure roller 53 also includes a cylindrical metal core portion 531 and an elastic portion 532 formed around the outer periphery of the metal core portion 531.

The pressure roller 53 is driven and rotated by a drive device (not shown). The fixing belt 52 and the fixing roller 520 rotate in conjunction with the pressure roller 53.

The fixing belt 52 heats the toner image formed on the sheet 9. The pressure roller 53 presses the toner image toward the sheet 9.

The fixing belt 52 and the pressure roller 53 convey the sheet 9 onto which the toner image has been transferred, and form a fixing nip portion for fixing the toner image to the sheet 9. The fixing position P2 is a position where the fixing nip portion is formed. The fixing belt 52 and the pressure roller 53 are arranged side by side along a horizontal plane (see FIG. 1). The heater 51 heats the fixing belt 52 on the opposite side of the fixing belt 52 from the pressure roller 53. The fixing belt 52 is an example of a fixing member according to the present disclosure. The pressure roller 53 is an example of a pressure member according to the present disclosure.

The sheet separating member 5200 separates the sheet 9 from the fixing belt 52 when the sheet 9 is attached to the fixing belt 52.

Figure 7:
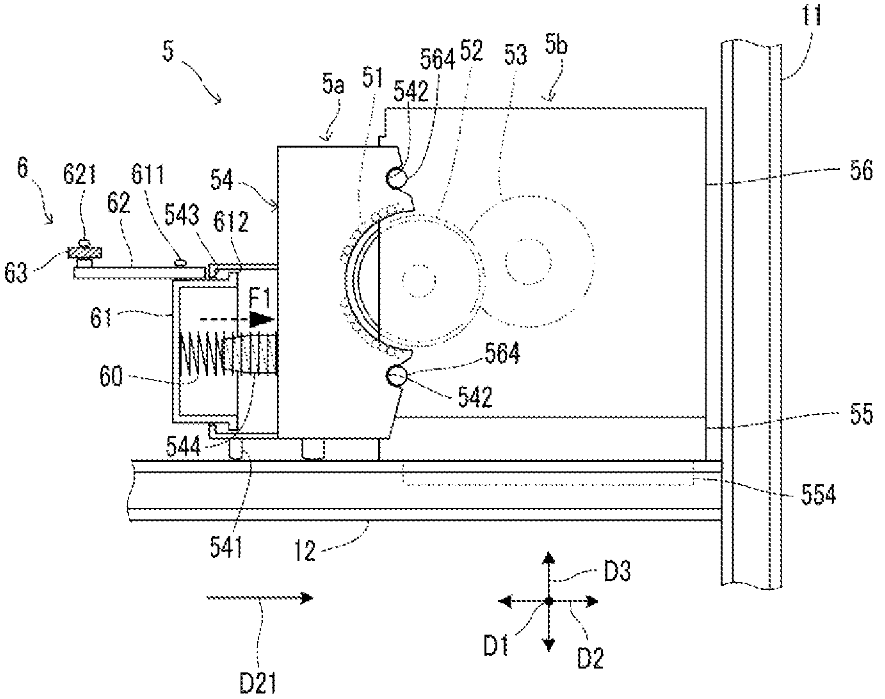
FIG. 7 is a front view of the fixing device and an interlocking mechanism in a biased state in the image forming apparatus according to the embodiment.
Figure 8:
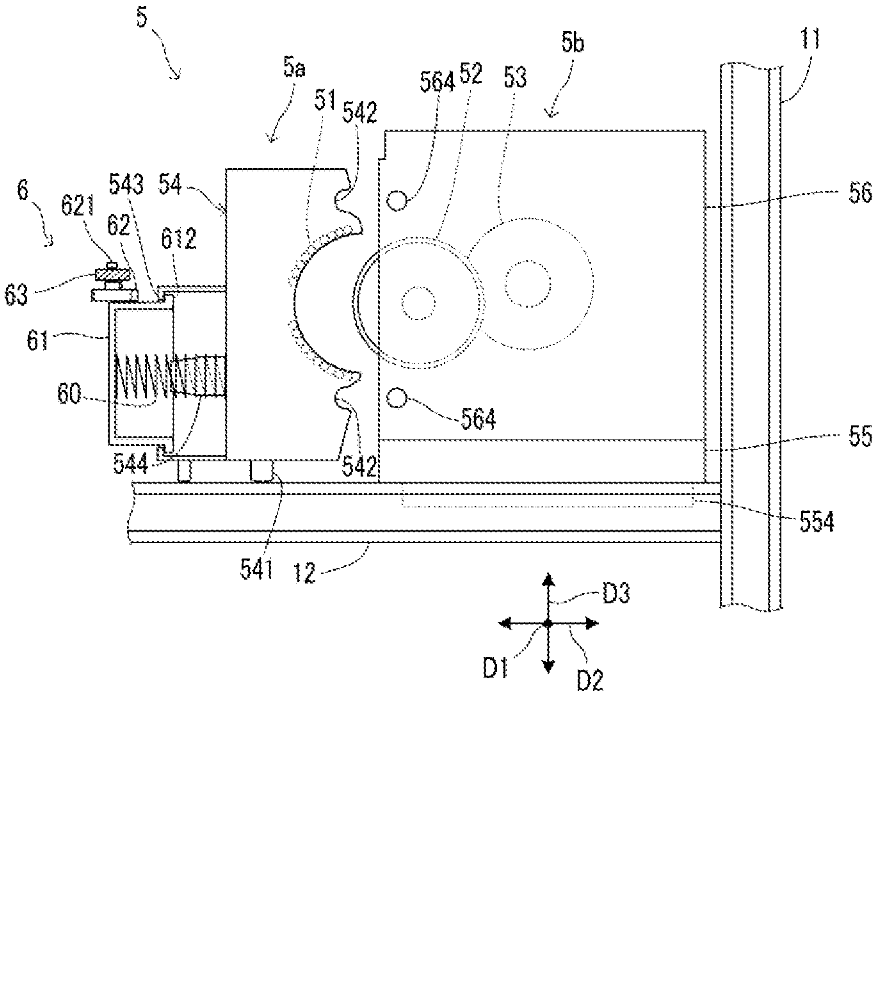
FIG. 8 is a front view of the fixing device and the interlocking mechanism in a retreat state in the image forming apparatus according to the embodiment.

In the present embodiment, the fixing device 5 is divided into a heating unit 5*a* and a fixing unit 5*b* (see FIGS. 7 and 8). The heating unit 5*a* includes the heater 51. The fixing unit 5*b* includes the fixing belt 52, the fixing roller 520, and the pressure roller 53.

Figure 10:
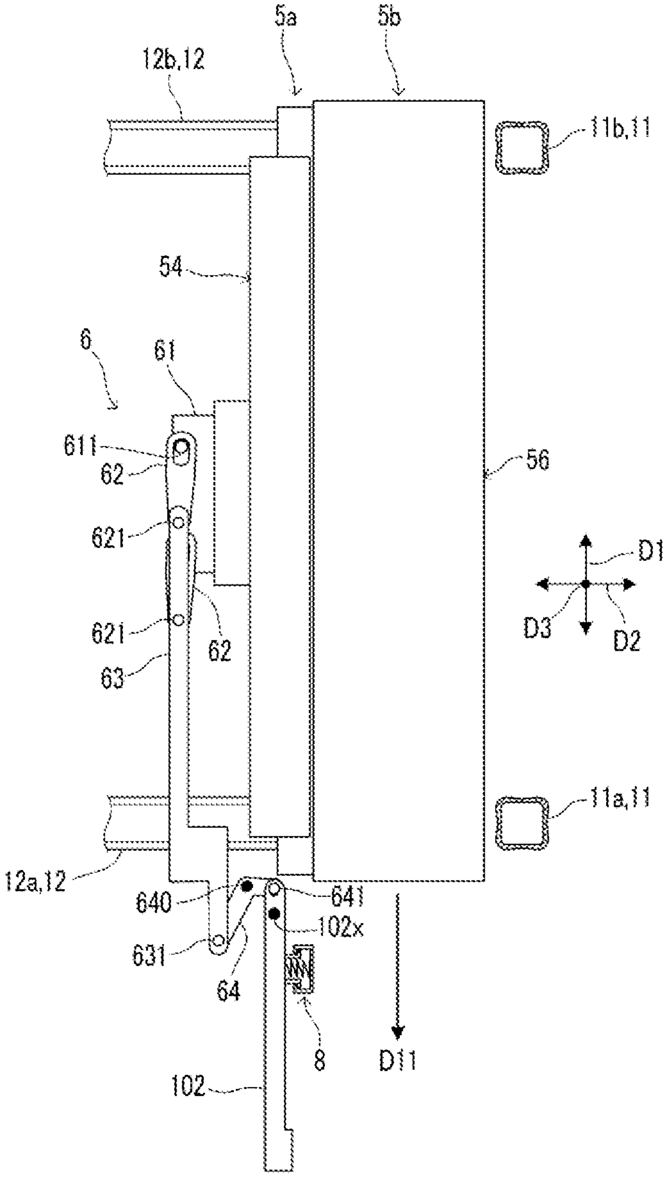
FIG. 10 is a plan view of the fixing device and the interlocking mechanism in the retreat state in the image forming apparatus according to the embodiment.

By moving the heating unit 5*a* to a position separated away from the fixing unit 5*b*, it is possible to pull out the fixing unit 5*b* from the main portion 1 in a removal direction D11 along a first direction D1 (see FIGS. 8 and 10). The first direction D1 is a direction along a center line of rotation of the fixing belt 52 and the pressure roller 53. In the present embodiment, the first direction D1 is the depth direction of the image forming apparatus 10.

[Configuration of Heating Unit 5*a* and Fixing Unit 5*b*]

The heating unit 5*a* includes the heater 51 and a support body 54 (see FIGS. 7 and 8). The support body 54 is a member that supports the heater 51.

Figure 4:
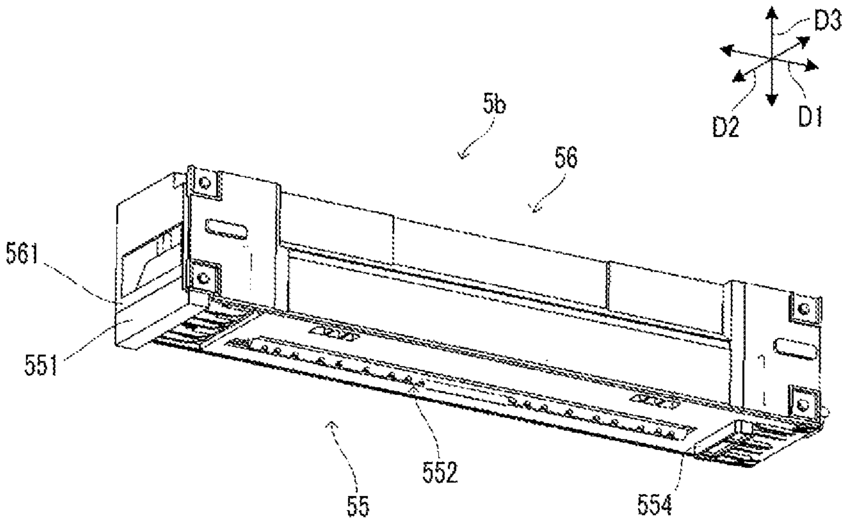
FIG. 4 is a perspective view of a fixing unit in the image forming apparatus according to the embodiment.
Figure 5:
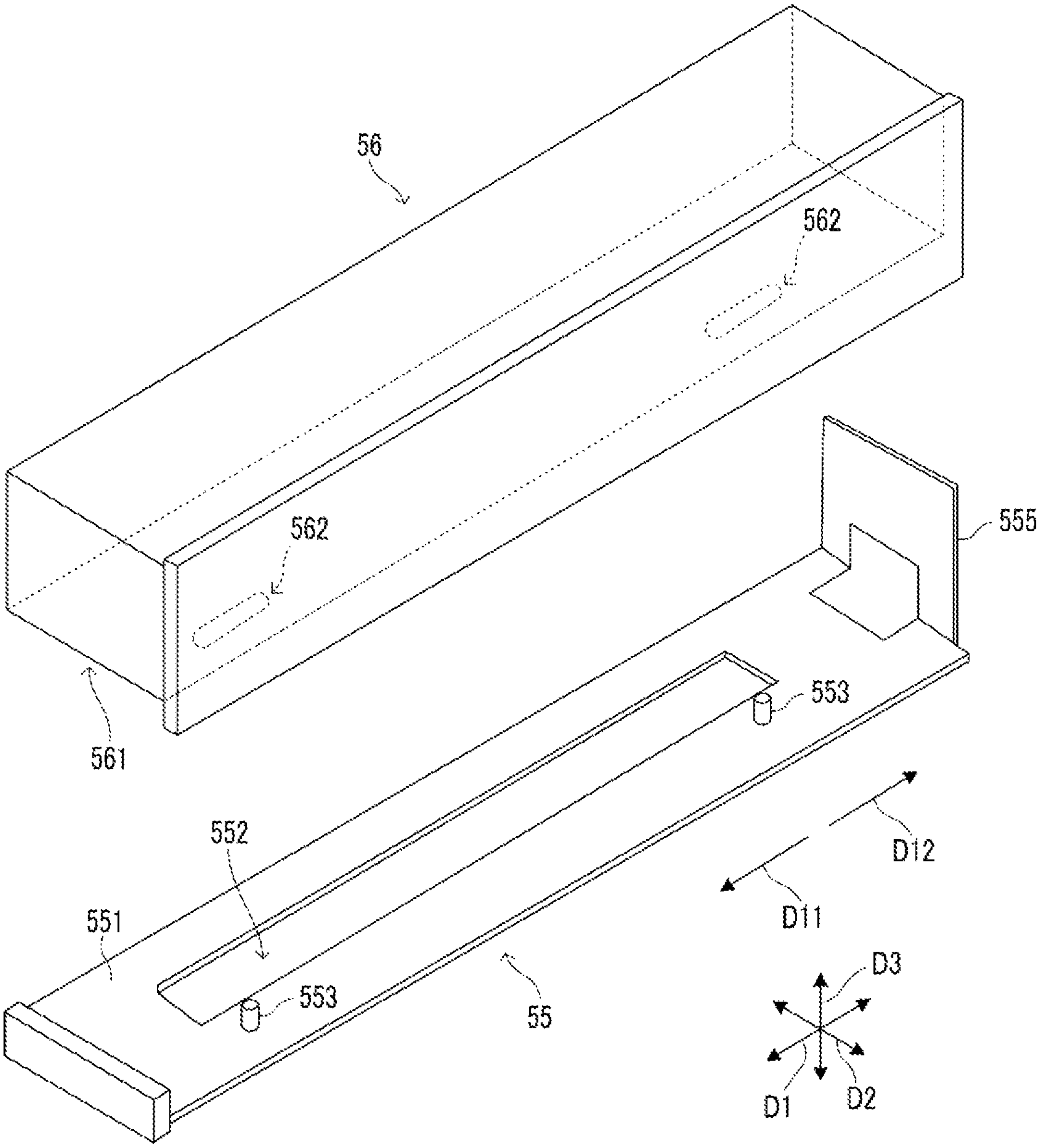
FIG. 5 is a perspective view of a support unit and a movable unit in the image forming apparatus according to the embodiment.

The fixing unit 5*b* includes a support unit 55 and a movable unit 56 (see FIGS. 4 and 5). The movable unit 56 includes the fixing belt 52, the fixing roller 520, and the pressure roller 53.

The support unit 55 supports the movable unit 56 below the movable unit 56.

As shown in FIGS. 4 and 5, the support unit 55 includes a support surface portion 551, an opening portion 552, protruding portions 553, a beam contact portion 554, and a side wall portion 555.

The support surface portion 551 forms a support surface that supports the movable unit 56. The support surface portion 551 is formed in a flat plate shape orthogonal to a vertical direction D3. The vertical direction D3 is an up-down direction. Note that the first direction D1 is also a direction orthogonal to the vertical direction D3. The support surface portion 551 is formed to be elongated in the first direction D1. FIG. 5 shows a state in which the movable unit 56 is lifted from the support surface portion 551.

The opening portion 552 is provided in the support surface portion 551. The sheet 9 conveyed to the fixing position P2 passes through the inside of the opening portion 552.

The protruding portions 553 are provided to protrude from the support surface of the support surface portion 551 toward the movable unit 56. More specifically, the protruding portions 553 protrude upward from the support surface portion 551. The protruding portions 553 are formed in a columnar shape. Note that the protruding portions 553 may be formed in a prismatic shape. As shown in FIG. 5, the support unit 55 includes two protruding portions 553 spaced apart in the first direction D1.

The beam contact portion 554 is provided to protrude downward from a bottom surface of the support surface portion 551 (see FIG. 4).

The side wall portion 555 is erected upright along one end of the support surface portion 551 in the first direction D1. More specifically, the side wall portion 555 is erected along an end on the upstream side of the support surface portion 551 in the removal direction D11.

The movable unit 56 rotatably supports the fixing roller 520 and the pressure roller 53. The fixing roller 520 supports fixing belt 52. That is, the fixing belt 52 is supported by the movable unit 56 via the fixing roller 520.

As shown in FIGS. 4 and 5, the movable unit 56 includes a bottom surface portion 561 and guide portions 562.

The bottom surface portion 561 forms a bottom surface of the movable unit 56. The bottom surface portion 561 is formed in a flat plate shape orthogonal to the vertical direction D3 (see FIG. 12). The bottom surface portion 561 is formed to be elongated in the first direction D1. The bottom surface portion 561 is placed on the support surface portion 551 of the support unit 55. An opening portion 565 (see FIG. 12) is formed in the bottom surface portion 561 for passing the sheet 9 to the fixing position P2. The fixing belt 52, the fixing roller 520, and the pressure roller 53 are provided above the bottom surface portion 561.

The guide portions 562 are provided on the bottom surface portion 561. Each guide portion 562 is formed so that a protruding portion 553 of the support unit 55 can be inserted therein (see FIG. 12). More specifically, the guide portions 562 are holes formed in the bottom surface portion 561. The guide portions 562 are formed to be elongated in the first direction D1. The guide portions 562 are provided corresponding to the two protruding portions 553 provided on the support unit 55. That is, the movable unit 56 includes two guide portions 562 spaced apart from each other in the first direction D1. When the movable unit 56 is attached to the support unit 55, the two protruding portions 553 are inserted into the two guide portions 562 (see FIG. 12).

The support unit 55 and the movable unit 56 are provided so as to be integrally insertable into and removable from the main portion 1, which is the housing of the image forming apparatus 10, along the first direction D1.

The portions of the fixing belt 52 that rub against edges on both side of the sheet 9 are more likely to wear than other portions of the fixing belt 52.

In contrast, in the image forming apparatus 10, the movable unit 56 is swinged along the width direction of the sheet 9. The width direction of the sheet 9 is the same direction as the first direction D1.

Figure 6:
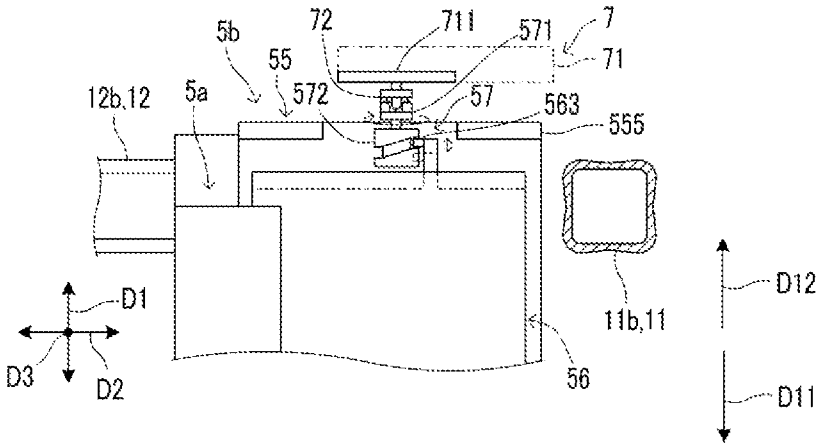
FIG. 6 is a plan view of a drive mechanism and a reciprocating mechanism in the image forming apparatus according to the embodiment.

The fixing unit 5*b* further includes a reciprocating mechanism 57 that causes the movable unit 56 to reciprocate along the first direction D1 (see FIG. 6).

The image forming apparatus 10 further includes a drive mechanism 7 arranged within the main portion 1 (see FIG. 6). The drive mechanism 7 is fixed to the main body frame 1*x*.

The drive mechanism 7 includes a reduction gear mechanism 71 including an output gear 711 and an output engagement portion 72. The output engagement portion 72 is formed integrally with the output gear 711. The output engagement portion 72 rotates at the same speed as the output gear 711.

The reduction gear mechanism 71 transmits the rotational force of a motor (not shown) to the output gear 711 while decelerating the rotational force. The output engagement portion 72 is a rotating body that transmits rotational force to the movable unit 56 of the fixing unit 5*b*.

The reciprocating mechanism 57 includes an input engagement portion 571 and a cylindrical cam 572. The input engagement portion 571 is provided so as to protrude from the side wall portion 555 of the support unit 55 in the mounting direction D12. The mounting direction D12 is the opposite direction to the removal direction D11. The input engagement portion 571 engages with output engagement portion 72. The input engagement portion 571 transmits the rotational force of the output engagement portion 72 to the cylindrical cam 572. The input engagement portion 571 and the cylindrical cam 572 are provided at both ends of a shaft member extending in the first direction D1. The shaft member is rotatably supported by the side wall portion 555.

The movable unit 56 of the fixing unit 5*b* has a cam engagement portion 563 that engages with a cylindrical cam 572. As the cylindrical cam 572 rotates, the cam engagement portion 563 reciprocates along the first direction D1.

By reciprocating the cam engagement portion 563 along the first direction D1, the entire movable unit 56 reciprocates along the first direction D1. That is, the reciprocating mechanism 57 converts the rotational movement of the output engagement portion 72 into the reciprocating movement of the movable unit 56.

The reciprocating mechanism 57 reciprocates the movable unit 56 once every time a plurality of sheets 9 pass between the fixing belt 52 and the pressure roller 53.

For example, the movement range of the movable unit 56 in the first direction D1 is approximately 3 mm to 10 mm.

For example, the reciprocating mechanism 57 moves the movable unit 56 by about 0.02 mm to 0.08 mm each time one sheet 9 passes through the fixing device 5.

The guide portions 562 of the movable unit 56 guide the protruding portions 553 of the support unit 55, which swings relative to the movable unit 56, along the first direction D1. The guide portions 562, which are swinged by the reciprocating mechanism 57, are restricted by the protruding portions 553 from moving in the second direction D2 orthogonal to the first direction D1. That is, the protruding portions 553 restrict movement of the movable unit 56, which is swinged by the reciprocating mechanism 57, in the second direction D2. The second direction D2 is the lateral direction of the image forming apparatus 10. In addition, the second direction D2 is also a direction orthogonal to the vertical direction D3.

Here, a case where the fixing unit 5*b* is divided into the movable unit 56 and the support unit 55, it is necessary to provide a contact point between the movable unit 56 and the support unit 55 to release static electricity generated by friction between the fixing belt 52 and the sheet 9. The contact point is required to prevent the electrical connection between the movable unit 56 and the support unit 55 from becoming unstable due to the swinging of the movable unit 56 relative to the support unit 55.

In contrast, as will be described below, in the image forming apparatus 10 of an embodiment according to the present disclosure, it is possible to stabilize the electrical connection between the movable unit 56 and the support unit 55 included in the fixing device 5.

More specifically, the guide portions 562 of the movable unit 56 have conductivity. For example, the bottom surface portion 561 including the guide portions 562 is manufactured by processing a metal plate. In addition, the guide portions 562 are electrically connected to a static eliminating member that neutralizes the surface of the fixing belt 52. The movable unit 56 is an example of the second unit according to the present disclosure.

Moreover, the protruding portions 553 of the support unit 55 that are inserted through the guide portions 562 have electrical conductivity. For example, the protruding portions 553 are made of metal. Furthermore, the protruding portions 553 are electrically connected to ground of the image forming apparatus 10. The support unit 55 is an example of the first unit according to the present disclosure.

That is, the guide portions 562 and the protruding portions 553 function as the contact points for dissipating static electricity generated by friction between the fixing belt 52 and the sheet 9.

Note that the guide portions 562 may be provided in the support unit 55. In that case, the protruding portions 553 may be provided on the movable unit 56.

In addition, in the image forming apparatus 10, the movable unit 56 is pressed in the pressing direction D21 (see FIG. 12) by the heating unit 5*a*, as will be described below. The pressing direction D21 is a direction perpendicular to the first direction D1 and along a horizontal plane. More specifically, the pressing direction D21 is a direction along the second direction D2. The heating unit 5*a* is an example of a pressing portion according to the present disclosure.

[Mechanism for Pressing the Movable Unit 56]

Figure 3:
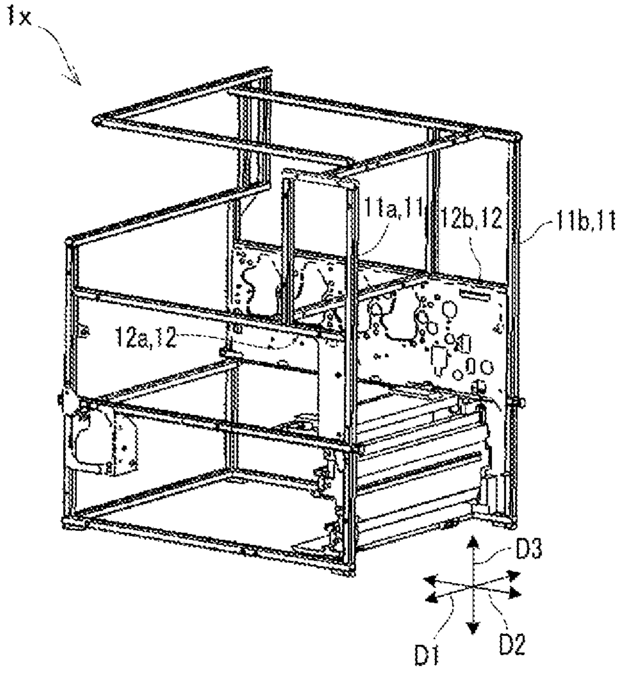
FIG. 3 is a perspective view of a main body frame of the image forming apparatus according to the embodiment.
Figure 11:
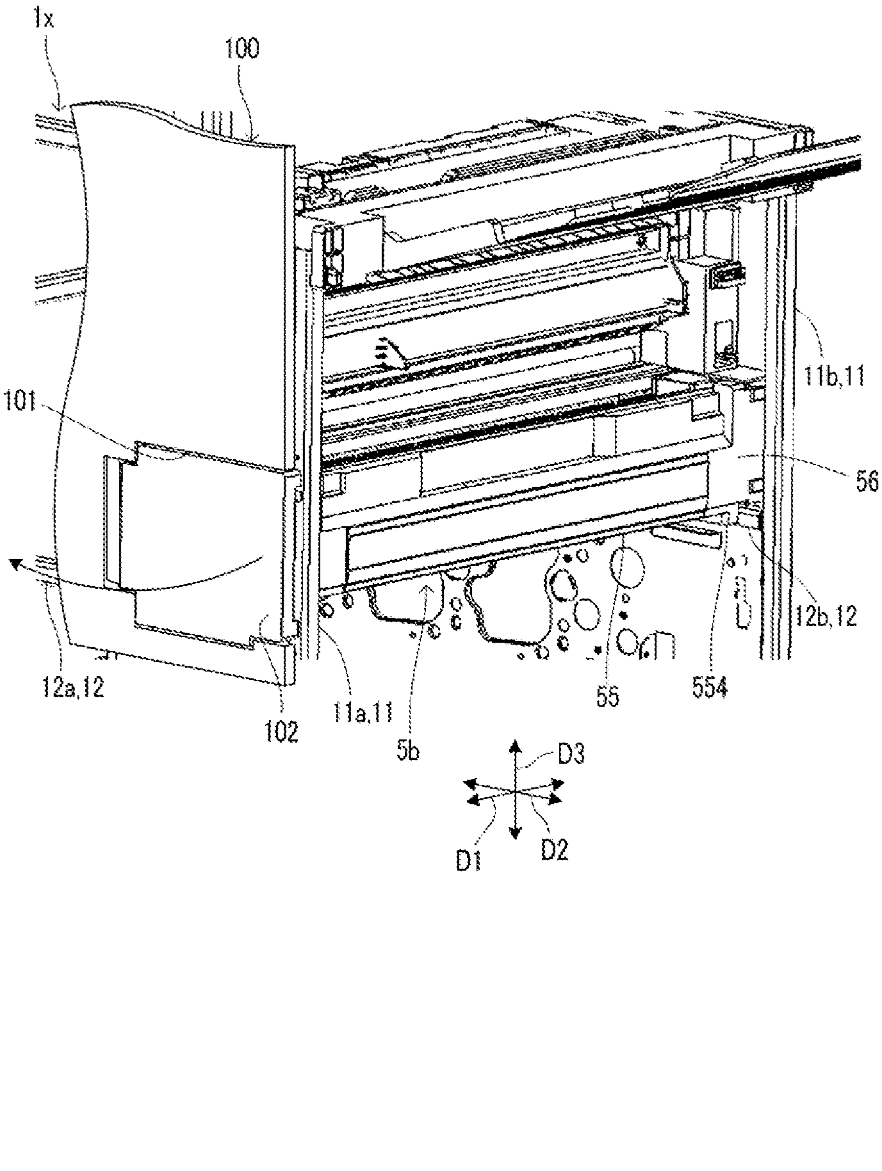
FIG. 11 is a perspective view of the surrounding area of the fixing unit and a cover member in the image forming apparatus according to the embodiment.

The main portion 1 of the image forming apparatus 10 includes a main body frame 1*x* and an exterior member 100 that covers the main body frame 1*x* (see FIGS. 3 and 11).

The main body frame 1*x* is configured as a combination of a plurality of metal pipes (see FIG. 3). The heating unit 5*a* and the fixing unit 5*b* are supported by the main body frame 1*x*. The fixing unit 5*b* is arranged next to the heating unit 5*a*.

The exterior member 100 is attached to the main body frame 1*x* (see FIG. 11). The exterior member 100 forms the exterior of the image forming apparatus 10.

The plurality of metal pipes of the main body frame 1*x* have two support column portions 11 and two beam portions 12 (see FIG. 3).

The two support column portions 11 are formed to extend in the vertical direction D3, and are arranged at intervals in the first direction D1 (see FIG. 3).

The two support column portions 11 are formed to extend in the vertical direction D3 next to the fixing unit 5*b* (see FIG. 7).

The exterior member 100 has an opening portion 101 and a cover member 102 (see FIG. 11). The opening portion 101 is a portion in which an opening is formed that opens one end of the fixing unit 5*b* in the first direction D1.

Figure 9:
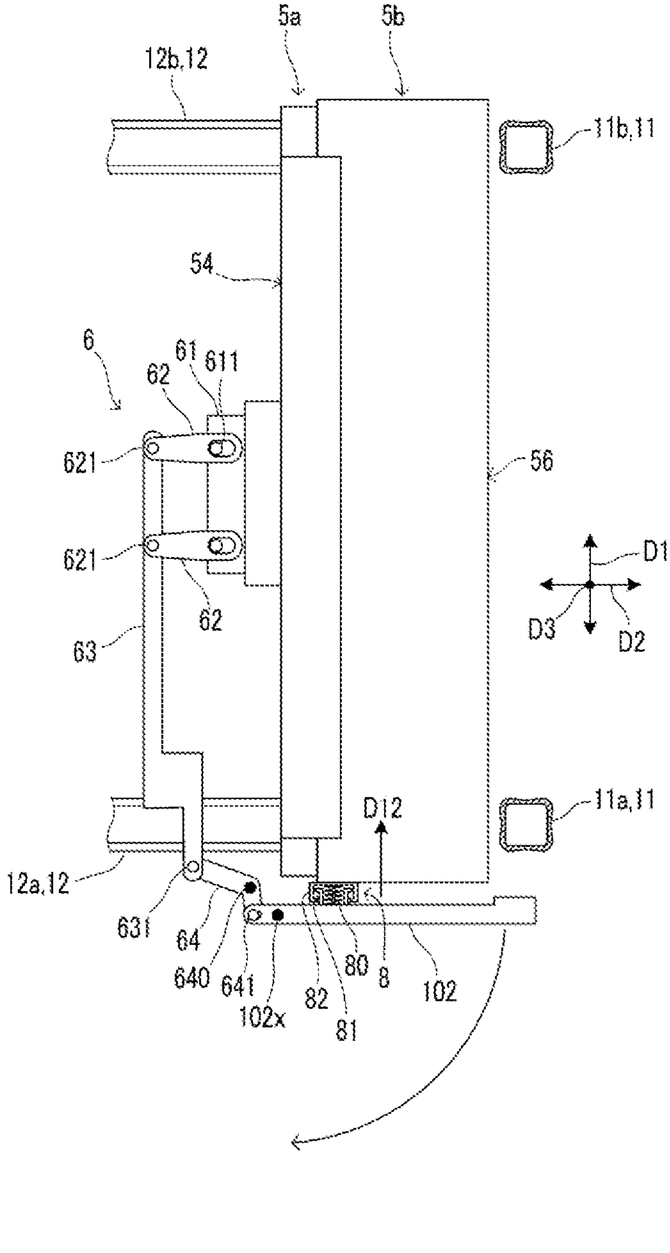
FIG. 9 is a plan view of the fixing device and the interlocking mechanism in the biased state in the image forming apparatus according to the embodiment.

The cover member 102 is supported by a first support shaft 102*x* (see FIGS. 9 and 10). Thus, the cover member 102 is rotatable about a first support shaft 102*x*. The cover member 102 is rotatable between a closed position where the opening portion 101 is closed and an open position where the opening portion 101 is opened.

FIGS. 7 and 9 show the fixing device 5 when the cover member 102 is in the closed position. FIGS. 8 and 10 show the fixing device 5 when the cover member 102 is in the open position.

When the cover member 102 is in the closed position, the cover member 102 is held in the closed position by a locking mechanism (not shown). When the lock by the locking mechanism is released, the cover member 102 can be rotated from the closed position to the open position.

The two support column portions 11 include a first support column portion 11*a* arranged on a front side of the image forming apparatus 10 and a second support column portion 11*b* arranged on a rear side of the image forming apparatus 10 (see FIG. 3).

The two beam portions 12 are formed to extend in the second direction D2 below the heating unit 5*a* and the fixing unit 5*b*, and are spaced apart in the first direction D1 (see FIGS. 3 and 9).

The two beam portions 12 are connected to the two support column portions 11 (see FIG. 3). For example, the two beam portions 12 are connected to the two support column portions 11 by welding.

The two beam portions 12 include a first beam portion 12*a* arranged on the front side of the image forming apparatus 10 and a second beam portion 12*b* arranged on the rear side of the image forming apparatus 10 (see FIG. 3).

The fixing unit 5*b* is arranged between the heating unit 5*a* and the two support column portions 11 (see FIG. 7).

The support body 54 of the heating unit 5*a* is placed on the two beam portions 12 in a state of spanning between the two beam portions 12. Similarly, the support unit 55 of the fixing unit 5*b* is placed on the two beam portions 12 in a state of spanning between the two beam portions 12.

That is, neither the heating unit 5*a* nor the fixing unit 5*b* is fixed to the main body frame 1*x* with fixtures such as screws.

The heating unit 5*a* and the fixing unit 5*b* are placed on the two beam portions 12 with the longitudinal direction of each oriented in the first direction D1 (see FIGS. 9 and 10).

The heating unit 5*a* and the fixing unit 5*b* are arranged side by side in the second direction D2. That is, the second direction D2 is the direction in which the heating unit 5*a* and the fixing unit 5*b* are arranged.

The image forming apparatus 10 further includes a first spring 60 and an interlocking mechanism 6 (see FIGS. 7 to 10). For example, the first spring 60 is supported by a protruding portion 544 of the support body 54.

The first spring 60 biases the support body 54 toward the movable unit 56 by an elastic force (see FIG. 7). The support body 54 is biased by the first spring 60 and comes into contact with the movable unit 56. Thus, the movable unit 56 is pressed in the pressing direction D21 (see FIG. 12) by the heating unit 5*a*.

The biasing force F1 of the first spring 60 against the support body 54 is larger than a static frictional force of the heating unit 5*a* with respect to the two beam portions 12. Therefore, the heating unit 51*a* that has received the biasing force F1 moves in the pressing direction D21. In addition, the biasing force F1 is smaller than the sum of the static frictional force of the heating unit 5*a* with respect to the two beam portions 12 and the static frictional force of the support unit 55 with respect to the two beam portions 12. The movable unit 56 is restricted from moving in the pressing direction D21 by the protruding portions 553 of the support unit 55 inserted into the guide portions 562 (see FIG. 12).

Therefore, the movement in the pressing direction D21 of the heating unit 51*a* that has received the biasing force F1 is stopped by the movable unit 56 whose movement in the pressing direction D21 is restricted by the support unit 55. The heating unit 51*a* is positioned by being pressed in the pressing direction D21 and coming into contact with the movable unit 56.

Figure 12:
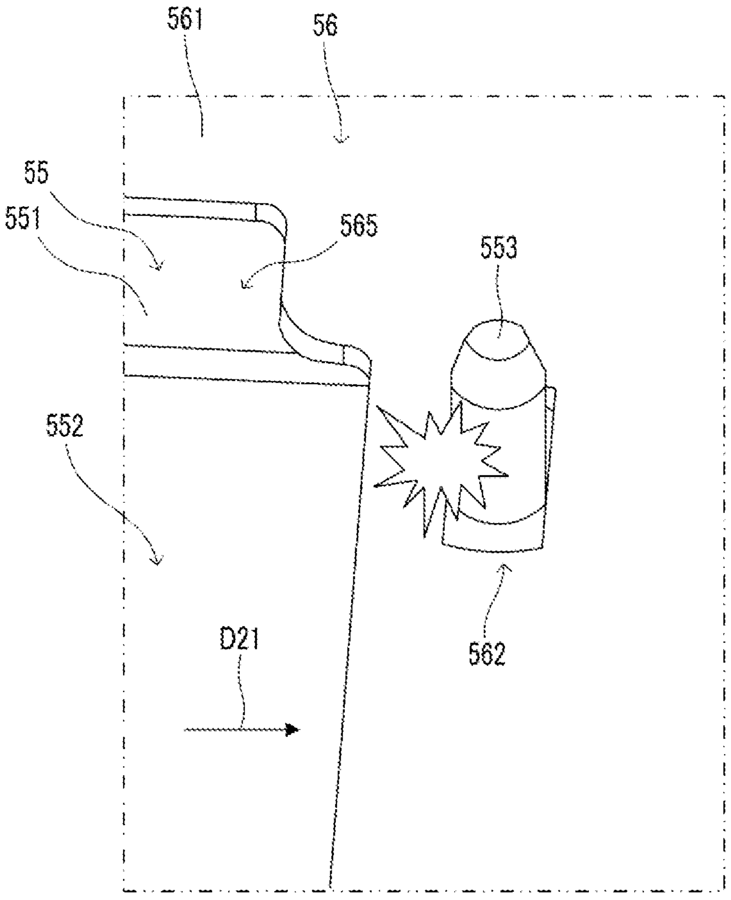
FIG. 12 is a perspective view of a protruding portion and a guide portion in the image forming apparatus according to the embodiment.

Here, when the heating unit 51*a* moves in the pressing direction D21 due to the biasing force F1 received from the first spring 60 and comes into contact with the movable unit 56, the protruding portions 553 of the support unit 55 are pressed in the pressing direction D21 from the guide portions 562 of the movable unit 56 (See FIG. 12). Thus, the stability of the electrical connection between the guide portions 562 and the protruding portions 553 is ensured.

The support body 54 has a plurality of ribs 541 that come in contact with the upper surfaces of the two beam portions 12. The ribs 541 of the support body 54 are provided to reduce static frictional force.

The bottom surface of the support surface portion 551 of the support unit 55 is placed on top surfaces of the two beam portions 12. The two beam portions 12 support the support unit 55 on the lower side of the support unit 55, and restrict movement of the support unit 55 in the pressing direction D21 by frictional force generated at the contact portion with the support unit 55. In other words, the two beam portions 12 function as restricting portions according to the present disclosure. Note that the bottom surface of the support surface portion 551 of the support unit 55 may be processed to increase static frictional force. In addition, a member for increasing the static frictional force may be provided on the bottom surface of the support surface portion 551 of the support unit 55.

Note that the two support column portions 11 may come in contact with the support unit 55 inserted into the main portion 1, and may restrict the movement of the support unit 55 in the pressing direction D21. In other words, the two support column portions 11 may function as a restricting portion according to the present disclosure.

The support body 54 has a plurality of recessed first fitting portions 542 that open in a lateral direction (see FIGS. 7 and 8). The support body 54 has four first fitting portions 542 formed at intervals in the first direction D1 and the vertical direction D3.

The movable unit 56 has a plurality of protruding second fitting portions 564 that can be fitted into the plurality of first fitting portions 542. The movable unit 56 has four second fitting portions 564 corresponding to the four first fitting portions 542.

When the first spring 60 biases the support body 54, the inner surfaces of the recessed portions of the four first fitting portions 542 come into contact with the four second fitting portions 564 (see FIG. 7).

In addition, by fitting the second fitting portions 564 into the first fitting portions 542, relative movement of the support body 54 and the movable unit 56 in the vertical direction D3 is restricted.

Note that the movable unit 56 may include the first fitting portions 542 and the support body 54 may include the second fitting portions 564.

The interlocking mechanism 6 moves the heating unit 5*a* along the second direction D2 in conjunction with the movement of the cover member 102.

When the cover member 102 moves from the closed position to the open position, the interlocking mechanism 6 moves the support body 54 of the heating unit 5*a* from the reference position to the retreat position (see FIGS. 7 and 8).

The reference position is the position of the support body 54 when the support body 54 is in contact with the movable unit 56. The retreat position is a position of the support body 54 when the support body 54 is separated from the movable unit 56.

When the support body 54 moves from the reference position to the retreat position, the four second fitting portions 564 are separated from the four first fitting portions 542 (see FIG. 8).

Note that positioning the support body 54 at the reference position has the same meaning as positioning the heating unit 5*a* at the reference position. In addition, the fact that the support body 54 is positioned at the retreat position is synonymous with the fact that the heating unit 5*a* is positioned at the retreat position.

When the support body 54 is located at the retreat position, the fixing unit 5*b* can be pulled out from the main body frame 1*x* in the removal direction D11 along the first direction D1 (see FIG. 10).

When the fixing unit 5*b* is pulled out from the main body frame 1*x*, the fixing unit 5*b* can pass through the opening portion 101 of the exterior member 100.

On the other hand, when the cover member 102 moves from the open position to the closed position, the interlocking mechanism 6 moves the support body 54 from the retreat position to the reference position (see FIGS. 7 and 8).

When the support body 54 moves from the retreat position to the reference position, the four second fitting portions 564 fit into the four first fitting portions 542 (see FIG. 7).

The cover member 102 also serves as an operation portion that can be moved between a first position and a second position by being operated. The closed position of the cover member 102 is the first position of the operation portion. The open position of the cover member 102 is the second position of the operation portion.

For example, the interlocking mechanism 6 includes an action member 61, two first link members 62, a second link member 63, and a third link member 64 (see FIGS. 9 and 10).

The action member 61 is arranged so as to be movable along the second direction D2. The two first link members 62 are connected to the action member 61 by two first connecting shafts 611. The second link member 63 is connected to the two first link members 62 by two second connecting shafts 621.

The third link member 64 is supported by a second support shaft 640. The third link member 64 is rotatable about the second support shaft 640. The third link member 64 is connected to the second link member 63 by a third connecting shaft 631. The cover member 102 is connected to the third link member 64 by a fourth connecting shaft 641.

The interlocking mechanism 6 shown in FIGS. 9 and 10 is a link mechanism that converts the rotation of the cover member 102 into the movement of the action member 61 along the second direction D2.

When the cover member 102 rotates, the second link member 63 moves along the first direction D1 by the action of the third link member 64.

When the second link member 63 moves along the first direction D1, the action member 61 moves along the second direction D2 due to the action of the first link member 62.

When the cover member 102 moves from the closed position to the open position, the interlocking mechanism 6 moves the action member 61 in a direction away from the fixing unit 5*b*. When the cover member 102 moves from the open position to the closed position, the interlocking mechanism 6 moves the action member 61 in a direction toward the fixing unit 5*b*.

The first spring 60 is arranged between the action member 61 and the support body 54 of the heating unit 5*a* (see FIGS. 7 and 8). The action member 61 pushes the first spring 60 toward the support body 54 when approaching the support 54 along the second direction D2 (see FIG. 7).

When the action member 61 pushes the first spring 60 toward the support body 54, the first spring 60 biases the support body 54 toward the reference position.

The action member 61 has an engaging portion 612 that can engage with an engaged portion 543 of the support body 54 (see FIG. 7). When the action member 61 moves along the second direction D2 in the direction away from the support body 54, the engaging portion 612 engages with the engaged portion 543.

When the action member 61 moves along the second direction D2 in the direction away from the support body 54, the support body 54 receives a force from the action member 61 through the engaging portion 612, and moves from the reference position to the retreat position (See FIG. 8).

On the other hand, when the action member 61 moves along the second direction D2 in the direction approaching the support body 54, the support body 54 receives a force from the action member 61 through the first spring 60, and moves from the retreat position to the reference position (See FIG. 7).

Note that the interlocking mechanism 6 may include a gear mechanism such as a rack and pinion mechanism. In that case as well, the interlocking mechanism 6 converts the rotation of the cover member 102 into the movement of the action member 61 along the second direction D2.

The heating unit 5*a* and the fixing unit 5*b* are positioned in the vertical direction D3 by being placed on the two beam portions 12. The loads of the heating unit 5*a* and the fixing unit 5*b* restrict upward movement of the heating unit 5*a* and the fixing unit 5*b*.

In addition, the image forming apparatus 10 further includes a cover biasing mechanism 8 attached to an inner surface of the cover member 102 (see FIGS. 9 and 10).

The cover biasing mechanism 8 includes a second spring 80, a spring case 81, and a cap portion 82 (see FIG. 9).

The spring case 81 accommodates the second spring 80. The cap portion 82 is movably attached to the spring case 81.

When the cover member 102 is positioned in the closed position, the second spring 80 is sandwiched between the cover member 102 and the support unit 55 of the fixing unit 5*b*. In the present embodiment, the second spring 80 and the cap portion 82 are sandwiched between the cover member 102 and the support unit 55.

The second spring 80 is sandwiched between the cover member 102 and the support unit 55, and thereby biases the support unit 55 inserted into the main portion 1 in the mounting direction D12 by elastic force (see FIG. 9). The second spring 80 is an example of a biasing portion according to the present disclosure. Furthermore, the mounting direction D12 is an example of an insertion direction according to the present disclosure.

In addition, when the cover member 102 is positioned in the closed position, the force that the support unit 55 receives from the second spring 80 causes the beam contact portion 554 to come in contact with one side surface of the two beam portions 12. In the present embodiment, the beam contact portion 554 comes in contact with the side surface of the second beam portion 12*b*. The second beam portion 12*b*, by coming in contact with the beam contact portion 554, stops movement of the support unit 55 in the mounting direction D12 farther on the downstream side in the mounting direction D12 than the support unit 55 inserted into the main portion 1. In addition, the second beam portion 12*b* restricts the movement of the support unit 55 in the pressing direction D21 due to the frictional force generated at the contact portion with the beam contact portion 554 of the support unit 55. In other words, the second beam portion 12*b* functions as a restricting portion according to the present disclosure.

The fixing unit 5*b* is positioned in the first direction D1 by the action of the second spring 80 and the beam contact portion 554.

Note that the cover biasing mechanism 8 may be attached to the support unit 55 of the fixing unit 5*b*.

In this way, in the image forming apparatus 10, the movable unit 56 of the fixing unit 5*b* is pressed in the pressing direction D21 by the heating unit 5*a*. In addition, by the movable unit 56 being pressed in the pressing direction D21, the protruding portions 553 of the support unit 55 inserted into the guide portions 562 of the movable unit 56 are pressed in the pressing direction D21 by the guide portions 562. Moreover, the guide portions 562 and the protruding portions 553 function as contact points for dissipating static electricity generated due to friction between the fixing belt 52 and the sheet 9. Thus, it is possible to stabilize the electrical connection between the movable unit 56 and the support unit 55.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a movable unit configured to be able to swing along a width direction of a sheet, and including a fixing member and a pressure member that form a fixing nip portion for fixing a toner image to the sheet;

a support unit configured to support the movable unit below the movable unit;

a conductive protruding portion provided to protrude from a first unit of one of the movable unit and the support unit toward a second unit of the other;

a conductive guide portion formed in the second unit so that the protruding portion is insertable therein, and configured to guide the protruding portion along the width direction with the protruding portion swinging relative to the second unit; and a pressing portion configured to press the movable unit in a pressing direction perpendicular to the width direction and along a horizontal plane.

2. The image forming apparatus according to claim 1, wherein the fixing member and the pressure member are arranged side by side along a horizontal plane; and the pressing portion includes a heater configured to heat the fixing member on a side of the fixing member opposite to the pressing member, and is positioned by being pressed in the pressing direction and coming into contact with the movable unit.

3. The image forming apparatus according to claim 1, wherein the movable unit and the support unit are provided to be integrally insertable into and removable from a housing of the image forming apparatus along the width direction; and the image forming apparatus comprises a restricting portion configured to come into contact with the support unit inserted into the housing and restrict movement of the support unit in the pressing direction.

4. The image forming apparatus according to claim 3, wherein the restricting portion supports the support unit below the support unit, and restricts movement of the support unit in the pressing direction by a frictional force generated at a contact portion with the support unit.

5. The image forming apparatus according to claim 3, comprising a biasing portion configured to bias the support unit inserted into the housing in an insertion direction in which the movable unit and the support unit are inserted; wherein the restricting portion stops movement of the support unit in the insertion direction farther at a downstream side in the insertion direction than the support unit inserted into the housing, and restricts movement of the support unit in the pressing direction by a frictional force generated at a contact portion with the support unit.

* * * * *